US012699738B2

(12) United States Patent
Chalkley

(10) Patent No.: US 12,699,738 B2
(45) Date of Patent: Aug. 4, 2026

(54) ENHANCED CONCEPTUAL SEARCH BASED ON ENRICHED CATEGORIZATIONS OF ITEM LISTINGS

(71) Applicant: eBay Inc., San Jose, CA (US)

(72) Inventor: Andrew Chalkley, Milwaukie, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 18/538,541

(22) Filed: Dec. 13, 2023

(65) Prior Publication Data

US 2025/0200115 A1     Jun. 19, 2025

(51) Int. Cl.
| | |
|---|---|
| *G06F 16/906* | (2019.01) |
| *G06F 16/9538* | (2019.01) |
| *G06N 3/0455* | (2023.01) |
| *G06N 3/09* | (2023.01) |

(52) U.S. Cl.
CPC ........ G06F 16/906 (2019.01); G06F 16/9538 (2019.01); G06N 3/0455 (2023.01); G06N 3/09 (2023.01)

(58) Field of Classification Search
CPC . G06F 16/906; G06F 16/9538; G06N 3/0455; G06N 3/09; G06N 3/045
See application file for complete search history.

(56) References Cited

U.S. PATENT DOCUMENTS

| | | | |
|---|---|---|---|
| 2012/0016873 A1* | 1/2012 | Mathieson ........ | G06F 16/24578 |
| | | | 707/723 |
| 2017/0177712 A1* | 6/2017 | Kopru ................. | G06F 16/3337 |
| 2018/0052929 A1* | 2/2018 | Liu ...................... | G06F 16/3347 |
| 2018/0157681 A1* | 6/2018 | Yang ..................... | G06F 16/538 |
| 2019/0095807 A1* | 3/2019 | Goswami ............. | G06F 16/2462 |
| 2019/0188295 A1* | 6/2019 | Sirotkovic .......... | G06F 16/2425 |
| 2024/0289361 A1* | 8/2024 | Batina ................. | G06F 16/3328 |
| 2024/0354436 A1* | 10/2024 | Mukherjee .......... | G06F 16/3344 |

* cited by examiner

*Primary Examiner* — Apu M Mofiz
*Assistant Examiner* — Oscar Wehovz
(74) *Attorney, Agent, or Firm* — Shook, Hardy & Bacon L.L.P.

(57) ABSTRACT

AI-driven techniques are provided for generating multi-modal vector representations that incorporate enriched, model-generated category embeddings to enable conceptual search of item listings. For example, the enhanced conceptualized search can include generating a search vector, using one or more generative artificial intelligence (AI) models, based on a received search query. Some embodiments of generating the search vector may include applying one or more generative AI models to one or more sets of prior user interactions. Based on the search vector, a particular item listing vector can be determined. The item listing vector can be generated by applying one or more generative AI models to each of an image of the item and a textual description of an item listing, and the item listing vector can be generated based on enhanced categories determined (e.g., using one or more generative AI models) for the item listing.

20 Claims, 7 Drawing Sheets

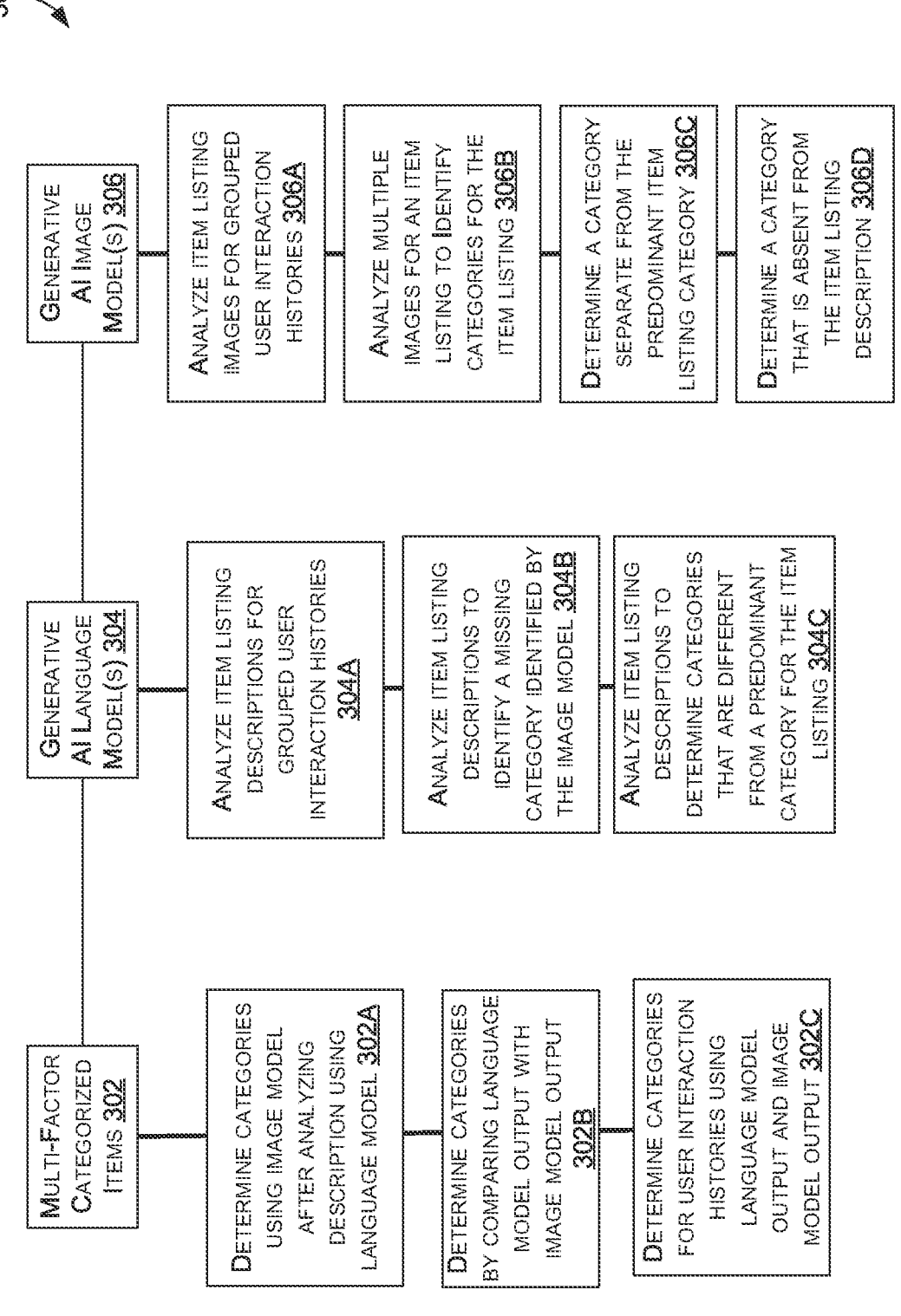

MULTI-FACTOR CATEGORIZED ITEMS 302

DETERMINE CATEGORIES USING IMAGE MODEL AFTER ANALYZING DESCRIPTION USING LANGUAGE MODEL 302A

DETERMINE CATEGORIES BY COMPARING LANGUAGE MODEL OUTPUT WITH IMAGE MODEL OUTPUT 302B

DETERMINE CATEGORIES FOR USER INTERACTION HISTORIES USING LANGUAGE MODEL OUTPUT AND IMAGE MODEL OUTPUT 302C

GENERATIVE AI LANGUAGE MODEL(S) 304

ANALYZE ITEM LISTING DESCRIPTIONS FOR GROUPED USER INTERACTION HISTORIES 304A

ANALYZE ITEM LISTING DESCRIPTIONS TO IDENTIFY A MISSING CATEGORY IDENTIFIED BY THE IMAGE MODEL 304B

ANALYZE ITEM LISTING DESCRIPTIONS TO DETERMINE CATEGORIES THAT ARE DIFFERENT FROM A PREDOMINANT CATEGORY FOR THE ITEM LISTING 304C

GENERATIVE AI IMAGE MODEL(S) 306

ANALYZE ITEM LISTING IMAGES FOR GROUPED USER INTERACTION HISTORIES 306A

ANALYZE MULTIPLE IMAGES FOR AN ITEM LISTING TO IDENTIFY CATEGORIES FOR THE ITEM LISTING 306B

DETERMINE A CATEGORY SEPARATE FROM THE PREDOMINANT ITEM LISTING CATEGORY 306C

DETERMINE A CATEGORY THAT IS ABSENT FROM THE ITEM LISTING DESCRIPTION 306D

RECEIVE SEARCH QUERY ~402

GENERATE SEARCH VECTOR BASED ON SEARCH QUERY ~404

DETERMINE AN ITEM LISTING VECTOR BASED ON THE SEARCH VECTOR ~406

PROVIDE AT LEAST ONE SEARCH RESULT BASED ON DETERMINING THE ITEM LISTING VECTOR ~408

500

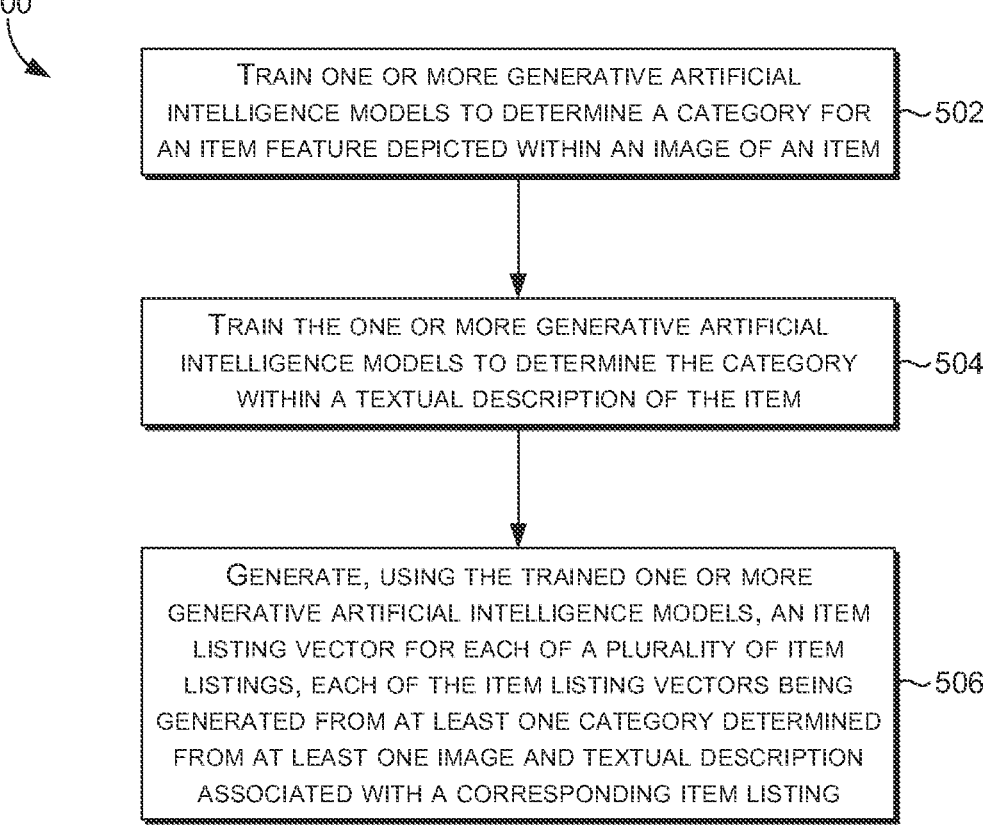

TRAIN ONE OR MORE GENERATIVE ARTIFICIAL INTELLIGENCE MODELS TO DETERMINE A CATEGORY FOR AN ITEM FEATURE DEPICTED WITHIN AN IMAGE OF AN ITEM ~502

TRAIN THE ONE OR MORE GENERATIVE ARTIFICIAL INTELLIGENCE MODELS TO DETERMINE THE CATEGORY WITHIN A TEXTUAL DESCRIPTION OF THE ITEM ~504

GENERATE, USING THE TRAINED ONE OR MORE GENERATIVE ARTIFICIAL INTELLIGENCE MODELS, AN ITEM LISTING VECTOR FOR EACH OF A PLURALITY OF ITEM LISTINGS, EACH OF THE ITEM LISTING VECTORS BEING GENERATED FROM AT LEAST ONE CATEGORY DETERMINED FROM AT LEAST ONE IMAGE AND TEXTUAL DESCRIPTION ASSOCIATED WITH A CORRESPONDING ITEM LISTING ~506

*FIG. 5*

ENHANCED CONCEPTUAL SEARCH BASED ON ENRICHED CATEGORIZATIONS OF ITEM LISTINGS

BACKGROUND

E-commerce search software provides users with search results based on search queries and search criteria, and offer users a shopping experience that allows them to browse through search results. For example, an e-commerce platform can analyze and index product data and other e-commerce data for users of the e-commerce platform to find suitable options. These types of software can provide various product recommendations. An e-commerce platform may also employ a generative artificial intelligence (AI) system, such as a class of AI systems and algorithms designed to generate new data or content that is similar to (or in some cases, entirely different from) data they are trained on. For instance, an e-commerce platform may employ generative AI for content generation (e.g., product descriptions), personalized shopping experiences (e.g., recommendation engines), product discovery (e.g., visual search), and virtual assistants (e.g., chat bots).

SUMMARY

At a high level, aspects described herein relate to systems, methods, and computer storage media for, among other things, providing an enhanced conceptualized search based on enriched categorizations of item listings. For example, the enhanced conceptualized search can include generating a search vector, using one or more generative AI models, based on a received search query (e.g., a textual search query, an audio search query, etc.). As an example, the search query may correspond to one or more items, which may be included within an item corpus comprising a plurality of item listings. To illustrate, the item corpus may include images of items offered by sellers on an e-commerce platform, such as parts for vehicles or accessories for vehicles, clothing items, toys, ornaments, etc.

In embodiments, the process of generating the search vector may include applying one or more generative artificial intelligence models to one or more sets of prior user interactions. For example, the one or more sets of prior user interactions can include user interaction data of a particular user associated with the search query, user interaction data of other users identified as having a particular similarity to the user, user interaction data of other users with a particular item or item feature corresponding to the search query, other types of prior user interactions, or one or more combinations thereof. In some embodiments, search query textual input, search query audio input, other types of search query input, prior user interactions associated with prior search queries, prior user interactions associated with particular item listings (e.g., purchases), other types of prior user interactions, or one or more combinations thereof, can be used for search vector generation via one or more of a word2vec embedding model, a doc2vec embedding model, an image embedding model (e.g., a convolutional neural network), a generative adversarial network, a recurrent neural network, a transformer, an autoencoder, a contrastive language-image pre-training model, a Siamese neural network, another type of model, or one or more combinations thereof.

As an example, the search vector can be generated based on applying one or more generative artificial intelligence models to a plurality of prior user interactions of the user who provided the search query. For instance, the plurality of prior user interactions of that user may include prior purchases and customized lists generated by the user from item listings within an item corpus. A first generative AI model or a first set of generative AI models may be applied to that plurality of prior user interactions to identify particular item listings including particular item features, price ranges, common sellers, etc., from item listing associated with the prior purchases, customized lists, and the search query. Based on identifying those the particular item listings, a second generative AI model or a second set of generative AI models may be applied to those particular item listings for generation of the search vector. In some embodiments, the search vector can be generated from both a textual embedding and an image embedding (e.g., associated with particular item listings) by applying the one or more generative artificial intelligence models to the search query and item listings identified from the prior user interactions.

In yet another example, the search vector can be generated based on applying the one or more generative artificial intelligence models to a plurality of prior user interactions (e.g., of the user who provided the search query), wherein the plurality of prior user interactions include previous search queries at a plurality of search engines (e.g., tracked based on one or more cookies at the search engines, tracked via a user device fingerprint, tracked via an IP address of a particular device associated with the user). A first generative AI model or a first set of generative AI models may be applied to that plurality of prior user interactions to identify particular item listings (e.g., including particular item features, price ranges, common sellers, etc.) associated with the search query (e.g., terms of the search query). Based on identifying those the particular item listings, a second generative AI model or a second set of generative AI models may be applied to those particular item listings for generation of the search vector.

Based on the search vector, a particular item listing vector can be determined, the item listing vector for an item listing of an item within a corpus of item listings. The item listing vector can be generated using one or more generative artificial intelligence models trained to generate the item listing vector based on an image of the item and a textual description of the item (e.g., the image and textual description of the item being part of the item listing). The one or more generative artificial intelligence models can include Bidirectional Encoder Representations from Transformers (BERT), a large language model, a generative-pre-trained transformer, a text-to-text transfer transformer, a conditional transformer language model, a generative adversarial network, a vector quantized variational autoencoder, a contrastive language-image pre-training model, other types of generative AI models, or one or more combinations thereof. As one non-limiting example, a generative adversarial network can be applied to an image of an item listing and a large language model can be applied to the description of the item within the item listing to generate the item listing vector. As another non-limiting example, the item listing vector can be determined based on having a closest distance to the search vector compared to other item listing vectors, wherein the distance is measured via one or more of an Euclidean distance, a Manhattan distance, a Minkowski distance, a cosine similarity, a Jaccard similarity, a Hamming distance, a correlation coefficient, another type of distance measurement, or one or more combinations thereof.

In some embodiments, the item listing vectors for a plurality of item listings can be generated based on at least two categories determined for each item listing (e.g., via a multi-factor categorization of the item listings, wherein the item listings are categorized using one or more generative AI models for enriched categorizations of these item listings). For example, an item listing vector may be generated from two or more categories that are each determined based on applying one or more generative AI models to one or more images within the item listing and to the textual description of that item listing, wherein one category is a broader category (e.g., troll dolls) than the other category (e.g., collectable troll dolls from the 1980's), and wherein the two or more categories are a different category than a predominating category (e.g., posters of trolls) for the associated item itself (e.g., a poster of trolls). In some embodiments, a particular weighting can be applied to each of the two categories (e.g., weighting the more narrow category higher) based on prior user interactions (e.g., weighting the "collectable troll dolls from the 1980's" category higher based on the user's birthday, based on the user previously viewing collectable troll dolls a threshold number of times, based on a prior purchase of a troll doll from the 1980's, etc.).

Based on determining a particular item listing vector, one or more search results can be provided (e.g., via user interface).

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 3 is a block diagram including generative artificial intelligence model(s) for providing enriched categorizations of item listings in an enhanced conceptualized search system, in accordance with an embodiment described herein;

FIG. 5 illustrates an example flowchart for generating enriched categorizations of item listings, in accordance with an embodiment described herein;

DETAILED DESCRIPTION

Figure 1:
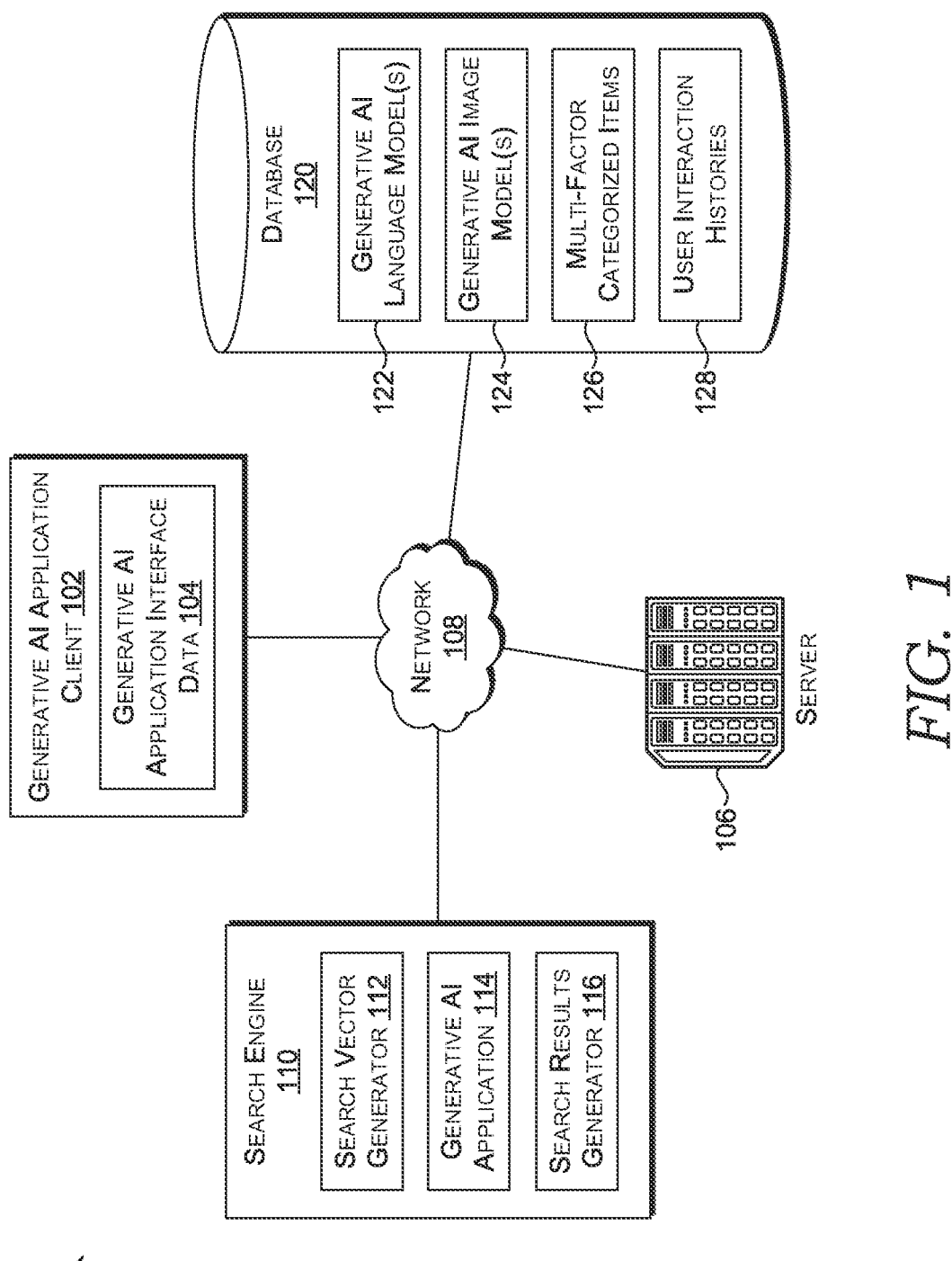
FIG. 1 includes an example operating environment suitable for an enhanced conceptualized search based on enriched categorizations of item listings, in accordance with an embodiment described herein.

General query searching refers to the process of using a search engine to find information over a network, such as the Internet (e.g., by entering text queries). For these general search queries, users can input a series of words or phrases into a search system, and the search engine returns a list of items, including web pages, documents, images, or other types of files that are considered relevant to the query.

Generative artificial intelligence (AI) is a category of machine learning models that are capable of creating new data samples that are similar to a given set of training data. This includes tasks such as generating text, images, or music, and is often associated with various deep learning techniques. The use of conventional generative AI models with search engines for image detection and generation of a specific existing digital image remains challenging. For example, conventional search engine and digital image generation systems have disadvantages in accuracy, efficiency, and flexibility.

To illustrate, many conventional search engine and digital image generation systems inaccurately or inefficiently detect and generate search results, such as search results including item listings that are not in accordance with a true intent of the user providing a particular search query. For instance, conventional systems often identify and generate search results based on arbitrary sampling or training, and therefore, cannot adapt to scenarios where generating specific search results is required. Further, some conventional systems are too slow or improperly trained for on-the-fly search result generation. As another example, to determine particular results to generate, many conventional systems learn a mapping via a Gaussian distribution of a domain, which results in either the random sampling of arbitrary items in a target domain or an inaccurate generation of items. In these ways, these conventional systems can thereby fail to generate high quality, targeted results that are specific to a particular user's preferences.

Furthermore, enhanced and more targeted search techniques are integral to the technical function of e-commerce search systems due to the volume of available online content or available stored content and the diversity of this content. For example, the Internet hosts billions of web pages, images, videos, social media data, advertising data, and other forms of data. Without sophisticated search techniques and ranking algorithms, it would be arduous to find and process the relevant information in this vast sea of content. Further, most digital e-commerce platforms store user activity data and other data in tables, which are often used to make predictions or other downstream analyses. Conventional semantic parser models, for example, attempt to learn joint representations of natural language text, but the structured schema of database tables, however, exhibit a strong underlying structure having short and discrete entries. That is, the structure of the natural language text stored therein inhibits the storage of free-forming natural language text.

Existing language models that are solely trained or fine-tuned for encoding free-forming natural language text of many characters (e.g., trained on books, web pages, letters, or other documents that have many natural language sentences or paragraphs) are not suitable for performing operations using data from a table containing one word in each column, where each word is unrelated, and where the values within the table can also be numbers, thereby making any natural language processing inaccurate or impossible. Recurrent Neural Networks (RNN), such as Long Short Term Memory (LSTM) models, for example, typically use prior sequential context of natural language words to predict the next word, which would be nearly impossible to do with tabular data. Further, a database table could potentially have a large quantity of rows (e.g., thousands), and encoding all of them using a resource-heavy language model with token input constraints can be an infeasible and arduous task.

With respect to the imaging models that can generate an output for a digital image, some conventional digital imaging systems utilize neural networks based purely on unlabeled datasets. As a result of the training on these unlabeled datasets, these conventional systems learn representations that are entirely disconnected from the semantics of the digital content displayed in the digital images and that are disconnected from the true intent of the user who provided a search query. For example, the digital content for a scene or background can be unrelated to the rest of the digital content. Further, many conventional digital imaging systems lack control over defining particular visual digital content boundaries and incorporating particular changes to the digital content. Due at least in part to their lack of semantic consideration, conventional digital imaging systems often generate digital images with inaccurate representations of digital content, such as by placing certain digital content (e.g., a computer) in illogical or otherwise undesirable locations (e.g., in an oven).

Furthermore, prior systems have not been configured with a comprehensive logic and infrastructure to effectively provide generative AI management of particular enhanced conceptualized searching based on particular categorizations of item listings. For example, these prior systems may rely on seller-provided descriptions that showcase products to potential buyers; however, these descriptions can lack coordinated or specific terms (e.g., classifying a stuffed animal as a "zebra" instead of a "mountain zebra") that would otherwise more properly categorize and describe something about the item. Additionally, sellers and products make it challenging to maintain consistent image styles (e.g., inconsistent backgrounds, lighting, and editing styles), which can result in problems for traditional classifiers in determining particular features of a product. Helping users find products through queries can be challenging, which can require sophisticated algorithms for image feature recognition and product tagging. Moreover, products should be complemented by accurate and methodical information descriptions, and sellers may neglect this, leading to confusion or dissatisfaction among buyers who are providing search queries.

It is desirable for e-commerce methods and systems to accurately identify particular item listings associated with a user's true intent and to provide an enhanced conceptualized search based on enriched categorizations of item listings that are instrumental in assisting the user. It is also desirable to enhance computer network component communications between or among the e-commerce system components, and between the e-commerce system and the client devices of the users who are utilizing the e-commerce platform. The technology described herein achieves these goals and provides various improvements to the problems specific to the prior systems discussed above.

For example, the technology discussed herein can generate search results based on enhanced conceptualized searches utilizing enriched categorizations of item listings, such that the search results are more tailored to a particular user's preferences or a particular user's intent. Further, the technology discussed herein can also reduce excessive computer input I/O operations (e.g., excess physical read/write head movements on non-volatile disk) by reducing the amount of time each operating system or other component processes a user request based on the technology providing enhanced conceptualized searches utilizing enriched categorizations of item listings to generate search results that are more tailored to a particular user's preference or intent, rather than continuously receiving user-provided search queries and filtering suggestions to arrive at the intended item listing. Furthermore, by providing these enhanced conceptualized searches that utilize enriched categorizations, the technology described herein can also reduce the physical wear on storage components, since the user device does not have to reach out to the storage device to perform a read or write operation for continuous additional queries, added search query term descriptions, or the application of various filters. (Read/write heads, for example, are very mechanical in nature and subject to information access errors because of the precise movements they must make when locating particular data. Such information access errors are more likely to occur when there is excessive computer I/O. Moreover, each repetitive input (e.g., reentering a search query, adding search query term descriptions, or applying various filters) also requires the data to be saved to memory, thereby unnecessarily consuming storage space.)

In embodiments of the present disclosure, a computer-implemented method begins by receiving a search query at a search engine, generating a search vector based on the search query, determining an item listing vector based on the search vector (the item listing vector of an item listing for an item of a corpus of item listings, the item listing vector generated using one or more generative artificial intelligence models trained to generate the item listing vector based on an image of the item and a textual description of the item, the item listing vector representing at least two categories determined for the item listing), and providing a search result for the search query based on determining the item listing vector. In some embodiments, the at least two categories are determined from an image aspect from the image of the item and a keyword from the textual description of the item. In some embodiments, the search vector is generated based on a set of prior user interactions of a user associated with the search query, the set of prior user interactions being identified by applying a generative artificial intelligence model to a plurality of prior user interactions of the user.

The term "user" may correspond to a human, a particular entity, a robot, another particular machine, etc.

The term "user interaction data" may include, for example, one or more addresses associated with previous purchases, items or services corresponding to previous purchases, items or services corresponding to previous clicks (e.g., a selection of an item listing or a selection of an image within an item listing), ratings provided for particular items or services, items or services indicated as "liked," items or services indicated as "favorite," other indications or notes provided by the user with respect to an item or service, scrolling within an item listing for a particular period of time, hovering over an image of an item within an item listing for a particular period of time, pauses between viewing item listings for a particular period of time, prior search query keywords or phrases, prior search query modifications and applied filters, other types of prior user interaction data, or one or more combinations thereof.

The term "item" referred to herein may mean something that can be identified in response to a search query (e.g., a search query within an e-commerce platform). For example, an item can be a good, a software product, a tangible item, an intangible item (e.g., computer software, an electronic document, a video of a movie, an audio of a song, an electronic photograph, etc.), another type of item, or one or more combinations thereof.

The term "item listing" referred to herein may include a title, one or more images, one or more videos, metadata, an item description, other item listing data, or one or more combinations thereof.

While reference may be made to an online marketplace utilizing the disclosed technology to identify and retrieve items and item listings for generating and regenerating three-dimensional environments (or other dimensional environments), it will be understood that the technology discussed herein may be used in a more general context of an online search engine (e.g., that identifies and retrieves web results, that provides answers in response to a search query, that provides related searches, that provides or identifies advertisements, that provides other types of results, or one or more combinations thereof).

Having provided some example scenarios, a technology suitable for performing these examples is described in more detail with reference to the drawings. It will be understood that additional systems and methods for providing the improved search results and navigation can be derived from the following description of the technology.

Turning now to FIG. 1, FIG. 1 illustrates example operating environment 100 in which implementations of the present disclosure may be employed. In particular, FIG. 1 illustrates a high-level architecture of operating environment 100 having components in accordance with implementations of the present disclosure. The components and architecture of FIG. 1 are intended as examples, as noted toward the end of the Detailed Description.

Example operating environment 100 includes generative AI application client 102 (e.g., a client device, a user device) including generative AI application interface data 104; a server 106; a network 108; a search engine 110 comprising search vector generator 112, generative AI application 114, and search results generator 116; and a database 120 comprising generative AI language model(s) 122, generative AI image model(s) 124, multi-factor categorized items 126, and user interaction histories 128.

The generative AI application client 102 may be a device that has the capability of using a wireless communications network, and may also be referred to as a "computing device," "mobile device," "client device," "user equipment," "wireless communication device," or "UE." A user device, in some embodiments, may take on a variety of forms, such as a PC, a laptop computer, a tablet, a mobile phone, a PDA, a server, or any other device that is capable of communicating with other devices (e.g., by transmitting or receiving a signal) using a wireless communication. Broadly, the generative AI application client 102 can include computer-readable media storing computer-executable instructions executed by at least one computer processor. One example of the generative AI application client 102 includes computing device 700 described herein with reference to FIG. 7.

As illustrated in example environment 100, the generative AI application client 102 may be capable of communicating with the search engine 110, the server 106, or the database 120 over the network 108. Other embodiments of example environment 100 may include additional generative AI application clients. The generative AI application client 102 may be operated by a user, such as one or more of a person, machine, robot, other user device operator, or one or more combinations thereof.

The generative AI application client 102 can be associated with seller interfaces and buyer interfaces. The generative AI application client 102 can also cause display of image data, text data, extended reality data, other types of data, or one or more combinations thereof, based on the server 106 operations or the search engine 110 operations (e.g., operations associated with the generative AI language model(s) 122, generative AI image model(s) 124, multi-factor categorized items 126, and user interaction histories 128).

In embodiments, the network 108 may be a local area network (LAN), a wide area network (WAN), a mesh network, a hybrid network, or other wired or wireless networks. Network 108 may be the Internet or some other public or private network. The generative AI application client 102 can be connected to network 108 via a network interface, such as by wired or wireless communication. Other embodiments of example environment 100 may include additional servers that are connected to the network 108.

Generally, server 106 is a computing device that implements functional aspects of operating environment 100. In embodiments, server 106 represents a backend or server-side device. In some embodiments, the server 106 can be an edge server which receives user device requests (e.g., a search query, etc.) and coordinates fulfillment of those requests (e.g., sometimes through other servers).

Figure 7:
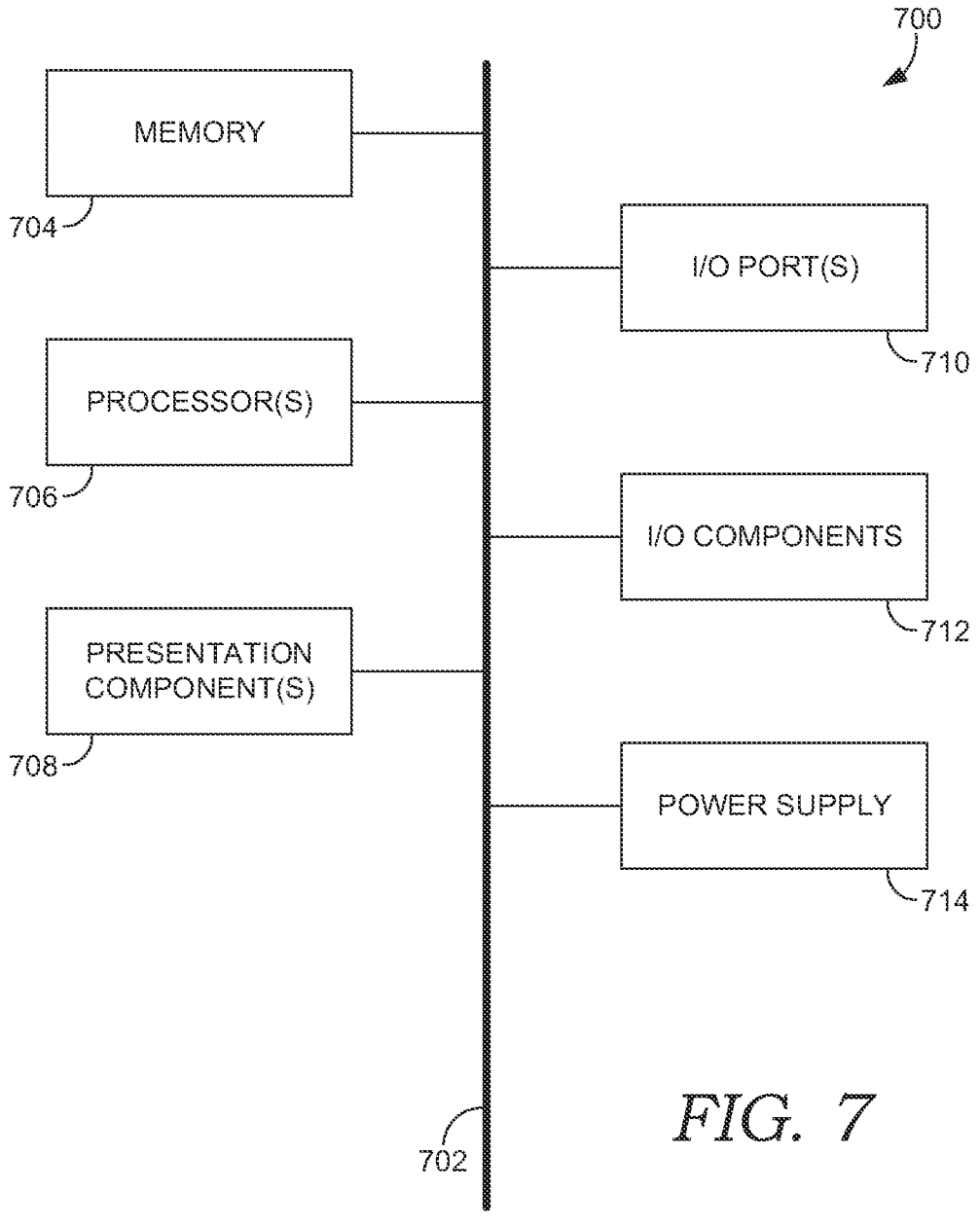
FIG. 7 is an example computing device suitable for implementing the described technology, in accordance with an embodiment described herein.

In addition, the server 106 can comprise computing devices, such as computing device 700 of FIG. 7. Though the server 106 is displayed logically as a single server, the server 106 can be, in other embodiments, a distributed computing environment encompassing multiple computing devices located at the same physical geographical location or at different physical geographical locations. In some embodiments, the server 106 can connect to the database 120 or, in other embodiments, the server 106 can be in communication with a plurality of servers that each share the database 120 or that each have their own database.

In embodiments, generative AI application client 102 is a client-side or front-end device and the server 106 is a backend or server-side computing device. The server 106 and the generative AI application client 102 may, in some embodiments, implement functional aspects of example operating environment 100, such as one or more functions of search engine 110. It will be understood that some implementations of the technology will comprise either a client-side or front-end computing device, a backend or server-side computing device, or both executing any combination of functions from search engine 110, among other functions or combinations of functions.

The generative AI application 114 of the search engine 110 can access the database 120 to execute tasks associated with a corresponding generative AI model (e.g., generative AI language model(s) 122, generative AI image model(s) 124). For example, a user—via the generative AI application client 102 (e.g., a prompt interface)—can communicate a request (e.g., a search query) to the search engine 110 to process the request. Based on communicating the request, the search engine 110 can execute operations (e.g. training, generating, deploying and integrating, mapping, rotating, and controlling operations) with components of the database 120 (e.g., the generative AI language model(s) 122 or generative AI image model(s) 124)—to ensure processing the request. The generative AI application 114 can leverage generative AI models (e.g., image generation models and Large Language Models) to create, generate, or produce content, data or outputs. Generative AI models, like GPT (Generative-Pre-trained Transformer) and its variants, are designed to generate human-like text or other types of data based on the input they receive (e.g., via a prompt interface). The generative AI application 114 can use generative AI to perform various tasks across different domains to provide improvement in automation, efficiency, and human-like interaction.

The search engine 110 and the generative AI application client 102 can operate in a server-client relationship to provide an enhanced conceptualized search for the generative AI application client 102 based on enriched categorizations of item listings. For example, a user can provide a search query from the generative AI application client 102 to execute the enhanced conceptualized search. Based on the search query, the search vector generator 112 of the search engine 110 can generate a search vector based on the search query. For example, the request can be processed such that interface data (e.g., image data, text data, etc.) is generated and communicated as generative AI application interface data 132.

In embodiments, the search vector generator 112 can generate the search vector by applying one or more generative artificial intelligence models to one or more sets of prior user interactions stored in the user interaction histories 128, to the search query itself (or portions thereof), or one or more combinations thereof. For example, the one or more sets of prior user interactions can include user interaction data of a particular user associated with the search query, user interaction data of other users identified as having a particular similarity to the user, user interaction data of other users with a particular item or item feature corresponding to the search query, other types of prior user interactions, or one or more combinations thereof. The one or more generative artificial intelligence models may include a generative adversarial network, a convolutional neural network, a recurrent neural network, a transformer, an autoencoder, a contrastive language-image pre-training model, a Siamese neural network, another type of generative AI model, or one or more combinations thereof.

The prior user interactions can be stored in the user interaction histories 128 within the database 120, which is capable of storing data, computer instructions (e.g., software program instructions, routines, or services), or models used in the embodiments described herein. For instance, database 120 may store computer instructions for implementing functional aspects of search engine 110. Although depicted as a single database component, database 120 may be embodied as one or more databases (e.g., a distributed computing environment encompassing multiple computing devices) or may be in the cloud. In other embodiments, the generative AI language model(s) 122 and the generative AI image model(s) 124 are stored in separate databases. In embodiments, the search engine 110 can be configured to run any number of queries on the database 120.

In embodiments, the search vector generator 112 can generate the search vector by accessing particular user interaction histories within user interaction histories 128, the particular user interaction histories being stored as data structures (e.g., log records or statistics in one or more tables, such as a relational database table). In some embodiments, the data structures can be generated using one or more cookies at the search engine 110 to organize user interaction histories by user. In some embodiments, the search vector generator 112 can generate the search vector using particular user interaction histories associated with a user device fingerprint or IP address of a user device of the user providing the search. For example, the search vector may be generated using particular user interaction histories from the user device providing the search that are stored within a table for that user device and from a particular time period.

In some embodiments, a first generative AI model or a first set of generative AI models may be applied for identifying particular user interaction data within a particular row or column within a data structure based on an increment (e.g., a quantity of clicks, purchases, "likes," shares via a particular digital platform, a number of views of an item listing) in a database table, and a second generative AI model or a second set of generative AI models may be applied for identifying particular user interaction data based on another increment. Based on identifying those the particular item listings, a third generative AI model or a third set of generative AI models may be applied to those particular item listings for generation of the search vector. For example, the search vector can be generated from a textual embedding and an image embedding of one or more of those particular item listings. For instance, for a search query for "collectable clocks" and prior user interactions including a previous purchase of an antique clock and a 1920's French clock, the search vector could be generated using a textual embedding and an image embedding from each item listing for the antique clock and the 1920's French clock. In another implementation, that search vector could be generated using a textual embedding and an image embedding from the antique clock based on that purchase being a recent purchase and based on the 1920's French clock purchase being purchased over a year ago.

In embodiments, the search vector can be generated based on prior user interaction data (e.g., within a history graph or table) having rankings (e.g., higher ranked item listing interactions having a particular category determined from the search query, higher ranked item listing interactions having a particular rating (e.g., above 4.6 stars and over 30 ratings)). For example, the prior user interaction data can be ranked within the user interaction histories 128 using one or more machine learning models (e.g., a convolutional neural network, recurrent neural network, a deep learning model, a gradient boosted decision tree, a random forest decision tree, another type of decision tree, a generative adversarial neural network, a regression model, another type of machine learning model, or one or more combinations thereof). For instance, in the clock example above, the search vector could be generated using a textual embedding and an image embedding from the antique clock based on the antique clock item listing having a higher ranking than the item listing for the 1920's French clock.

Based on the search vector, an item listing vector (of an item listing for an item of a corpus of item listings) can be determined based on the search vector. For example, the item listing vector may be generated using one or more generative artificial intelligence models (e.g., generative AI language model(s) 122 or generative AI image model(s) 124) trained to generate the item listing vector based on an image of the item and a textual description of the item within the item listing. Additionally, the item listing vector can also represent at least two categories determined for the item listing. For example, the item listing may be tagged with the categories and stored in the multi-factor categorized items 126.

In embodiments, the item listing vector can be generated by applying one or more of the generative AI language model(s) 122 to the description of the item within the item listing, one or more of the generative AI image model(s) 124 to one or more images of the item within the item listing, and one or more of the generative AI language model(s) 122 to determine categories for the item listing to store within the multi-factor categorized items 126. In some embodiments, two or more of the generative AI language model(s) 122 may perform tasks simultaneously, two or more of the generative AI image model(s) 124 may perform tasks simultaneously, or two or more of the generative AI language model(s) 122 and the generative AI image model(s) 124 may perform tasks simultaneously. As an example, a first generative AI language model can analyze a description of an item listing while a second generative AI language model determines an additional category for an item listing to store within the multi-factor categorized items 126. As another example, a generative AI language model can analyze the description of an item listing while a generative AI image model analyzes one or more images of the item listing.

In some embodiments, a singular multi-modal model can be used for determining categories for the item listing to store within the multi-factor categorized items 126. By way of example, the singular multi-modal model can analyze the description of an item listing and one or more images of the item listing to determine an additional category for the item listing for storage within the multi-factor categorized items 126. For instance, the singular multi-modal model can be applied to one or more images within the item listing and to the textual description of that item listing to identify two categories, the first category being a broader category (e.g., bright markers manufactured during the 80's) than the second category (e.g., shirts depicting bright markers manufactured during the 80's), such that the two categories are different categories than a predominating category (e.g., posters of people wearing shirts) for the associated item itself (e.g., a poster of a person wearing a shirt with bright markers). In some embodiments, the singular multi-modal model can determine the additional two categories that are different from the predominating category (or that was not previously described within the description of the item listing). In embodiments, the singular multi-modal model may be a contrastive language-image pre-training model or another type of singular multi-modal model.

In some embodiments, the categories are determined from an image aspect from the image of the item and a keyword from the textual description of the item. For example, one or more generative AI models can be applied to one or more images within the item listing and to the textual description of that item listing to identify two categories, the first category being a broader category (e.g., troll dolls) than the second category (e.g., collectable troll dolls from the 1980's), such that the two categories are a different category than a predominating category (e.g., posters of trolls) for the associated item itself (e.g., a poster of trolls). In some embodiments, one or more of the generative AI image model(s) 124 can be applied to one or more images of an item listing to determine a category that is different from the predominating category and that was not previously described within the description of the item listing.

For example, an item listing for a poster of elephants may have a predominating category of "elephant posters" and application of the generative AI image model(s) 124 to one or more images can identify that the elephants within the poster are a specific type of elephant (e.g., a Borneo elephant), which can be added as a category for the item listing within the multi-factor categorized items 126. As another example, an item listing for a flower painting may have a predominating category of "floral painting" and application of the generative AI image model(s) 124 to one or more images can identify that the flowers within the painting are a specific type of flower, which can be added as a category for the item listing within the multi-factor categorized items 126. In yet another example, an item listing for a clock may have a predominating category of "antique clock" and application of the generative AI image model(s) 124 to one or more images can identify that the clock is a particular clock that was originally manufactured during a particular time and within a particular region, which can be added as a category for the item listing within the multi-factor categorized items 126.

In some embodiments, a particular weighting can be applied to particular categories determined for the item listings within the multi-factor categorized items 126. For example, a particular category may be weighted more highly based on particular prior user interactions (e.g., based on a particular number of item listings associated with that category, based on a particular number of purchases for that category, based on a confidence score associated with that category). To illustrate, for an item listing having two different categories based on the various features of that item, a user having prior interaction histories that involve more interactions with the first category than the second category may result in the application of weighting the first category higher than the second category. In another illustration, the first category may be weighted higher, for a user without interaction histories or with interaction histories involving both categories, based on the first category having a greater number of associated purchases than the second category.

In example embodiments, the multi-factor categorized items 126 can include a search index that can be used by the search engine 110, such as an inverted index, but other index forms are also possible. The multi-factor categorized items 126 may include one or more tables of categories for each item within the search index. In embodiments, the multi-factor categorized items 126 including the inverted search index can include item listings that each correspond to a particular position within the index, the particular position being associated with an item listing vector including an array of values that represent the item and its determined categories. The particular position of the item listing vector can also be based on particular colors of the item, dimensions or sizes of the item, other features associated with the item, or one or more combinations thereof. In some variations of this embodiment, an item listing vector may be a dense embedding having a smaller number of values within the embedding, such that the dense embedding corresponds to the particular categories determined for that item (e.g., so that the search engine 110 can quickly identify a particular item listing vector (compared to a longer item vector)).

In some embodiments, the multi-factor categorized items 126 may be discrete components separate from search engine 110, or may be incorporated or integrated into the search engine 110 in other embodiments.

In embodiments, the generative AI language model(s) 122 may include a natural language understanding model, a large language model, a text-to-speech engine, an automatic speech recognition engine (e.g., a recurrent neural network, another transformer model, or another type of machine learning technique that can perform automatic speech recognition), Bidirectional Encoder Representations from Transformers (BERT), embeddings from language models (ELMo), bidirectional long short-term memory network (BiLSTM), etc., or one or more combinations thereof.

In some embodiments, one model within the generative AI language model(s) 122 is a larger model than another language model of the generative AI language model(s) 122. In some embodiments, the larger model has a higher number of transformer layers than the smaller model. In some embodiments, one model within the generative AI language model(s) 122 has a larger hidden size of an individual transformer layer than that of another generative AI language model. In some embodiments, one of the generative AI language models can have a largest number of trainable parameters compared to the other generative AI language models.

In some example embodiments, one of the generative AI language model(s) 122 can be pre-trained using another language model, such that the first model mimics the other model via a knowledge-distillation based agnostic (e.g., training a reduced-scale BERT using a full-scale BERT or training a reduced-scale BiLSTM using a full-scale BERT). In some embodiments, a convolutional neural network having connected layers following a convolutional layer, a deep belief network having connected layers, or another speech recognition technique within the generative AI language model(s) 122 can be used for speech processing.

In embodiments, one or more generative AI image model(s) 124 can be a generative artificial intelligence model including a Generative Adversarial Network (GAN), an autoencoder (e.g., a variational autoencoder, a denoising autoencoder, a convolutional encoder, etc.), a transformer model, another type of generative AI image model, or one or more combinations thereof. For example, in embodiments, the generative AI image model can receive both textual and image input as a single stream of data (e.g., the stream containing over a thousand tokens).

In some embodiments, one or more generative AI image model(s) 124 can be trained to identify an item feature within an image of an item (e.g., a particular color, brand, pattern, a particular feature associated with similar items manufactured by particular manufacturers, a particular feature associated with a particular design from a particular geographical area during a particular time period, item features that are associated with particular categories, etc.). In some embodiments, the one or more generative AI image model(s) 124 are trained to identify an item feature associated with a search query item. In some embodiments, the one or more generative AI image model(s) 124 are trained to identify a particular category for an item listing that is different from a predominating category of the item listing. In some embodiments, the one or more generative AI image model(s) 124 are trained to identify a particular category for an item listing that is different from the description within the item listing (e.g., provided by a seller).

In example embodiments, one or more segmentation techniques can be applied to an image for an item listing to identify image segments (e.g., particular pixel areas within the image). As another example, for image segmentation, a convolutional neural network (e.g., a fully convolutional network or U-Nets) can be used to recognize a plurality of different pixel areas within the image, and to also distinguish different pixel areas within the image of the item. In some embodiments, one or more segmentation techniques can be applied to an image for an item listing to identify (e.g., via one or more blur detection algorithms) and distinguish blurred pixel areas within the image of the item that are blurrier than other pixel areas within the image.

The search results generator 116 can provide search results based on determining the item listing vector using the search vector. For example, the search results can be provided based on the search vector (e.g., generated using a combination of search query terms and the user interaction histories 128) having a closest distance (e.g., measured via one or more of an Euclidean distance, a Manhattan distance, a Minkowski distance, a cosine similarity, a Jaccard similarity, a Hamming distance, a correlation coefficient, another type of distance measurement, or one or more combinations thereof) to the item listing vector compared to other item listing vectors. In some embodiments, additional search results can be generated based on user provided feedback (e.g., based on modifying the search vector using the feedback). For example, in some embodiments, the search vector can be reduced or expanded based on the user feedback upon receiving an initial set of search results provided by the search results generator 116. In addition, the modified search vector can be generated using the user interaction histories 128 (e.g., user interaction data of the user providing the feedback and the user interaction data related to the feedback, user interaction data of other similar users related to the feedback, etc.).

Figure 2:
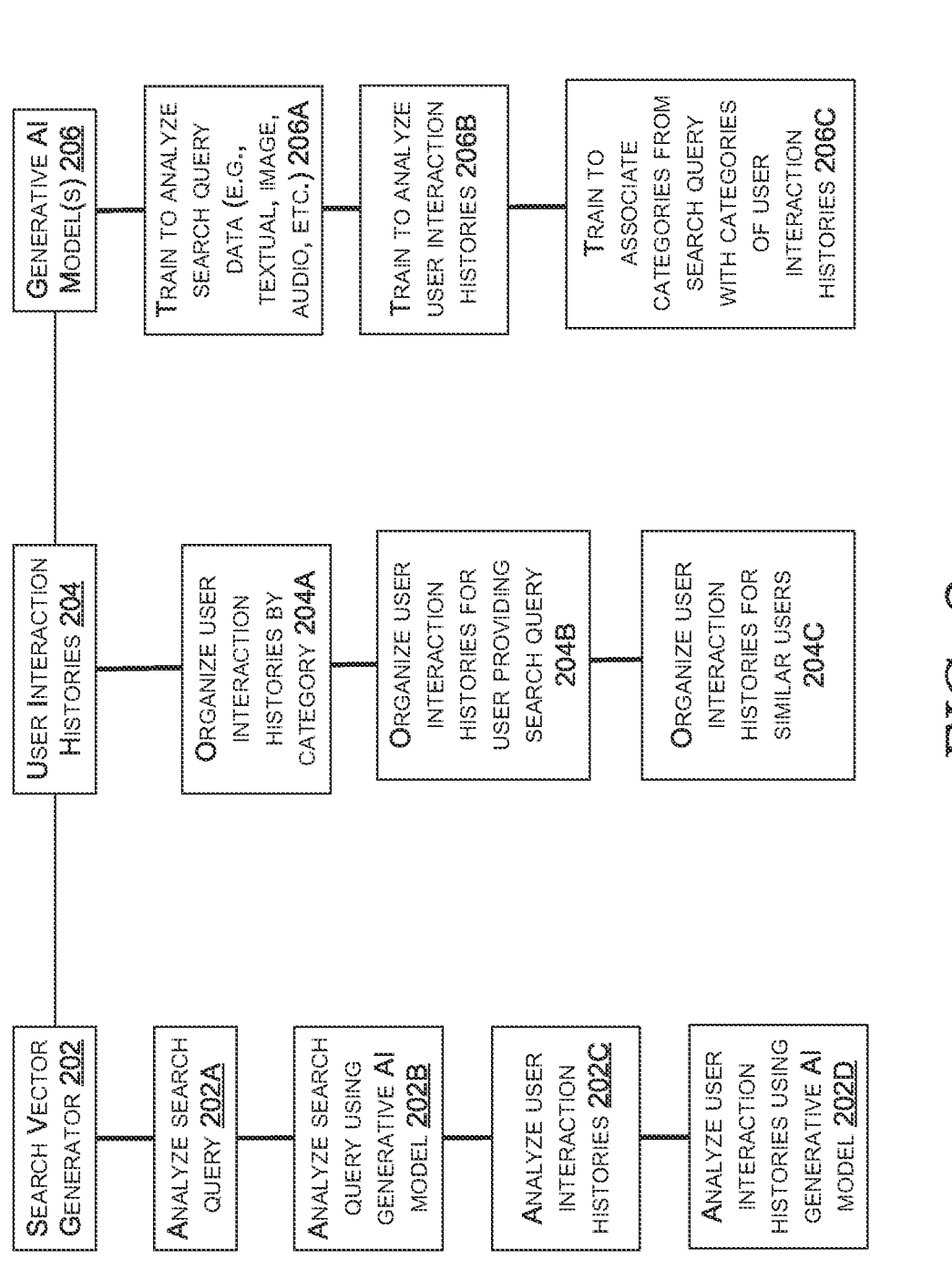
FIG. 2 is a block diagram including generative artificial intelligence model(s) for enhanced conceptualized search operations in an enhanced conceptualized search system, in accordance with an embodiment described herein.

FIG. 2 depicts example block diagram 200 for enhanced conceptualized search operations in an enhanced conceptualized search system. Example block diagram 200 includes example operations for search vector generator 202 (e.g., operations 202A, 202B, 202C, and 202D), example operations for storing user interaction histories 204 (e.g., operations 204A, 204B, and 204C), and example operations associated with one or more generative AI model(s) 206 (e.g., operations 206A, 206B, and 206C).

The search vector generator 202 can analyze search queries 202A (e.g., textual search queries, audio search queries, image search queries, etc., or one or more combinations thereof). For example, the search vector generator 202 can analyze search queries 202A using one or more of keyword matching (e.g., matching keywords to documents, webpages, user interaction history database(s), item listing indexes, user profile data, etc.), natural language processing (e.g., for search query semantic understanding, by parsing the query, identifying one or more entities associated with the provided query or a computer device that is providing the query, word relationship extraction or entity relationship extraction, etc.), natural language understanding, query expansion, intent recognition, personalization (e.g., associated with a user profile or associated with a location of the computing device providing the query), contextual analysis, etc.

The search vector generator 202 can analyze search queries using one or more generative AI models 202B. For example, the search vector generator 202 can analyze search queries 202B using one or more of a generative pre-trained transformer, a variational autoencoder, a recurrent neural network, a long short-term memory network, an attention-based model, a sequence-to-sequence model, a conditional generative model, a neural machine translation model, BERT, a zero-shot learning model, or one or more combinations thereof. For example, a variational autoencoder can be used to generate an improved image for the search query or extract relevant data from the image search query. As another example, the recurrent neural network can be used for generation of the search vector based on a sequence associated with identified features of a search image (e.g., the sequence being based on a location of the user device).

The search vector generator 202 can analyze user interaction histories 202C. For example, the search vector generator 202 can analyze particular user interaction histories associated with a user device fingerprint or IP address of a user device of the user providing the search. As another example, the search vector generator 202 can analyze particular user interaction histories (e.g., of one or more particular users) that include previous search queries at one or more search engines (e.g., tracked based on one or more cookies at the search engines). In some embodiments, one or more machine learning models (e.g., a convolutional neural network, recurrent neural network, a deep learning model, a gradient boosted decision tree, a random forest decision tree, another type of decision tree, a generative adversarial neural network, a regression model, another type of machine learning model, or one or more combinations thereof) can be used to analyze particular user interaction histories with item listings that have a particular category (e.g., a category that is both more relevant to the search query and that corresponds to higher volumes of user interactions, a category that is both more relevant to the search query and that corresponds to a particular rating (e.g., above 4.6 stars and over 30 ratings)).

The search vector generator 202 can analyze user interaction histories using one or more generative AI model(s) 202D. For example, the search vector generator 202 can apply a first generative AI model or a first set of generative AI models to prior user interaction histories to identify particular item listings (e.g., one or more of a category, particular item feature, price range, particular seller, particular brand, etc., or one or more combinations thereof) associated with the search query (e.g., terms of the search query), and then apply a second generative AI model or a second set of generative AI models to those particular item listings for generation of the search vector. For example, in some embodiments, one or more generative AI language models are applied to the descriptions of those identified item listings and one or more generative AI image models are applied to the images of those identified item listings. In some embodiments, user interaction histories of the user device that provided the search query are weighted more highly than the interaction histories of other users for generating the search query.

In embodiments, storing the user interaction histories 204 may include organizing user interaction histories based on a category 204A. For example, the category can be determined (e.g., by one or more generative AI models) based on that category not being present within the description of that item listing. In some embodiments, the user interaction histories can be organized for the particular user device that has provided the search query 204B. For example, particular user interaction histories for that user can be stored in an inverted index (e.g., having one or more tables for different categories of item listings the user interacted with, having item listings in the index that each correspond to a particular position associated with an item listing vector including an array of values that represent the item and its determined categories, having item listing vectors with dense embeddings, etc.). In some embodiments, the user interaction histories can be organized based on similarly identified users 204C (e.g., similar user groupings or clusters). For example, similar users can be identified based on similar geographical locations, similar birthdays, similarly purchased items, etc.

In embodiments, the generative AI model(s) 206 may be trained to analyze search query data 206, such as textual search query data, image search query data, audio search query data, etc., or one or more combinations thereof. For example, for the image search query data, a generative AI image model (e.g., generative adversarial network or a variant designed for image-to-image translation such as CycleGAN or Pix2Pix) can be trained using training data set for an image-based transition including pairs of related images, where each pair represents a transition (e.g., image A1 to image A2) within image set A and Image set B, the pairs covering one or more particular categories. In addition, the generative AI model(s) 206 can be trained to analyze user interaction histories 206B. For example, training data may include particular item listing data that corresponds to one or more particular categories. As another example, the training data may include particular user interactions associated with particular user data for the generative AI model (s) to identify particular users. Furthermore, the generative AI model(s) can be trained to associate categories from search queries with categories of user interaction histories 206C. For example, the generative AI model(s) can utilize extracted output from an embedding layer and utilize hidden states from specific layers for associating categories from search queries with categories of user interaction histories.

FIG. 3 illustrates example block diagram 300 for enriched categorizations of item listings in an enhanced conceptualized search system. Example block diagram 300 includes example operations for multi-factor categorized items 302 (e.g., operations 302A, 302B, and 302C), example operations associated with generative AI language model(s) 304 (e.g., operations 304A, 304B, and 304C), and example operations associated with generative AI language model(s) 306 (e.g., operations 306A, 306B, 306C, and 306D).

The multi-factor categorized items 302 can be generated by determining categories using one or more generative AI image models after analyzing item listing descriptions using the generative AI language model(s) 302A. For example, one or more generative AI models can be applied to one or more images within the item listing after determining particular categories from the description (e.g., provided by a seller) to determine a category that isn't present with the description. For example, a category from the description (e.g., Barbie dolls) may be a broader category or a less nuanced category than the category determined from the one or more images from the item listing (e.g., the second category determined using the images of the item being a particular outfit associated with the doll). Further, one or more generative AI models can be used to determine categories for the items by comparing generative AI language output with generative AI image output 302B. For example, the comparison can be used to determine two or more categories, such that the two or more categories are each a different category than a predominating category for the item listing (e.g., a predominating category for a coaster set being beach themed coasters, and the determined categories being a particular type of sand or tree depicted with the images for that item listing). In some embodiments, the determined categories from the images were not previously described within the description of the item listing.

The multi-factor categorized items 302 can also be generated by determining categories for user interaction histories using output from the generative AI model(s) 302C. For example, a generative AI language model can be applied to item listing descriptions and generative AI image model(s) can be applied to item listing images to determine categories. In some embodiments, the determined categories were not previously described within the descriptions. In some embodiments, the categories determined are different from a predominating category. In some embodiments, a plurality of user interaction histories are analyzed to determine common categories for the item listings from item listings the user purchased within a particular time period, or item listings a plurality of users within the same geographical area purchased and rated within a particular time period. In some embodiments, a plurality of user interaction histories of users having the same birthday month are analyzed to determine common categories.

The generative AI language model(s) can analyze item listing descriptions for grouped user interaction histories 304A. For example, user interaction histories may be grouped by user, by users having the same zodiac sign, by users within a particular geographical area, by users who all purchased a particular item or a particular grouping of items, etc. Additionally, the generative AI language model(s) can analyze item listing descriptions to identify one or more missing categories identified by one or more image models 304B. For example, a generative AI image model can be used for tagging or embedding item listing images with particular categories, and those categories can be compared with categories identified within the description of the item listing. Furthermore, generative AI model(s) can be used to analyze item listing descriptions to determine categories that are different from a predominating category for the item listing 304C.

The generative AI image model(s) can analyze item listing images for grouped user interaction histories 306A, analyze multiple images for each item listing and identify one or more categories for each item listing 306B, determine a category that is separate from the predominant item listing category 306C, and determine a category that is absent from the item listing description 306D. In some embodiments, one or more generative AI image model(s) can be trained to learn item features from smaller pixel areas sampled from a larger pixel area. In some embodiments, structural similarity techniques may be used for image analysis. In some embodiments, one or more generative AI image model(s) can be trained on pre-annotated images provided by sellers that generated item listings including those images.

Example Flow Charts

Figure 4:
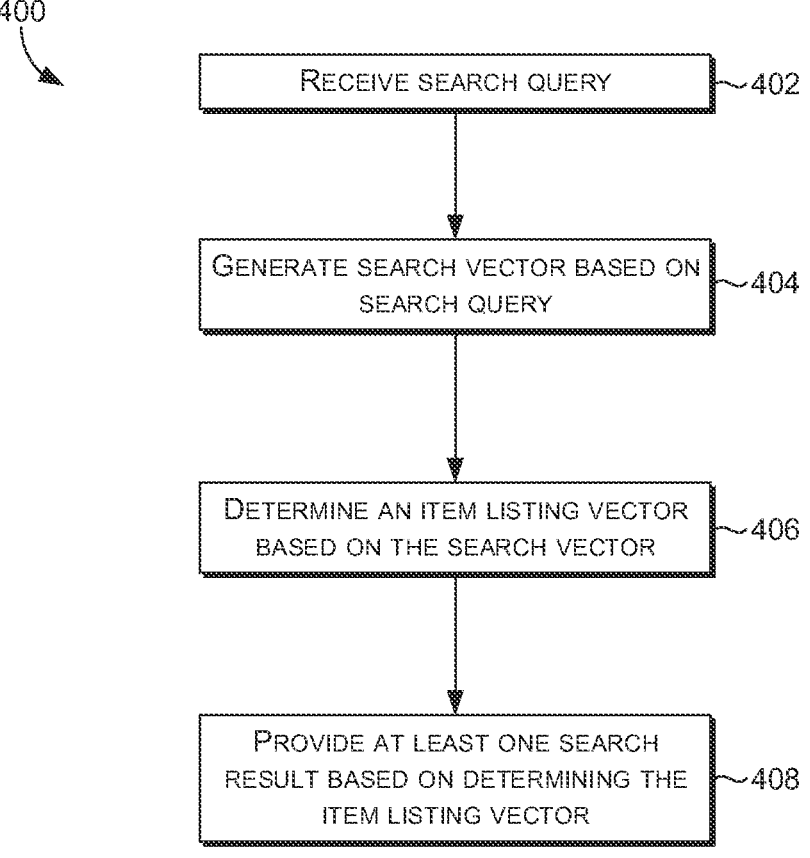
FIG. 4 illustrates an example flowchart for an enhanced conceptualized search based on enriched categorizations of item listings, in accordance with an embodiment described herein.

Flowchart 400 of FIG. 4 begins at step 402 with receiving a search query (e.g., at a search engine). At 404, a search vector is generated from the search query. For example, the search vector can be generated based on a set of prior user interactions of a user associated with the search query (e.g., the search query for "rainbow colored shirts" and the set of prior user interactions including interactions with item listings of dolls wearing rainbow colored shirts, rainbow shirt lollipops, posters with people wearing rainbow shirts), the set of prior user interactions being identified by applying a generative artificial intelligence model to a plurality of prior user interactions (e.g., including all user views and purchases of item listings within a particular time period) of the user to identify the set of prior user interactions corresponding to a first category (e.g., rainbow shirts having wider/thicker bands of each color within the rainbow) and a second category (e.g., rainbow shirts having non-traditional rainbow colors). In some embodiments, the search vector can be generated from a textual embedding and an image embedding by applying the one or more generative artificial intelligence models to prior user interactions (e.g., by concatenating an image embedding from a rainbow shirt illustrated within a poster having non-traditional colors with an image embedding from a rainbow shirt having wide color bands worn by a doll, by concatenating a text embedding from an item listing for the poster having the non-traditional colors with an text embedding from an item listing for the rainbow shirt having the wide color bands worn by the doll, and then generating a search vector using the concatenated image embedding and the concatenated text embedding).

At 406, an item listing vector is determined based on the search vector (e.g., the item listing vector of an item listing for an item of a corpus of item listings, the item listing vector generated using one or more generative artificial intelligence models trained to generate the item listing vector based on an image of the item and a textual description of the item, the item listing vector representing at least two categories determined for the item listing). For example, the item listing vector can be generated based on determining, by one or more generative artificial intelligence models, a first category (e.g., not described within a description for the item listing), for a feature depicted on a first set of items within item images within the item listings of the corpus (e.g., the feature being a sparkling pink dress and the first set of items including princess characters each wearing a sparkling pink dress). At 408, one or more search results are provided based on determining the item listing vector.

Flowchart 500 of FIG. 5 begins at step 502 with training one or more generative artificial intelligence models to determine a category for an item feature depicted within an image of an item. Step 504 includes training the one or more generative artificial intelligence models to determine the category within a textual description of the item. For example, the one or more generative AI models can include Bidirectional Encoder Representations from Transformers (BERT) and an imaging model. Step 506 includes generating, using the trained one or more generative artificial intelligence models, an item listing vector for each of a plurality of item listings, each of the item listing vectors being generated from at least one category determined from at least one image and textual description associated with a corresponding item listing. For example, each of the item listing vectors may be generated from a first category and a second category determined from the at least one image and textual description associated with the corresponding item listing, the first category being a broader category than the second category, and wherein the first category and the second category are a different category than a predominating category for the associated item itself. In some embodiments, the first category is a meta-category and the second category is a leaf category.

Example Enhanced Conceptualized Search System Environment

Figure 6:
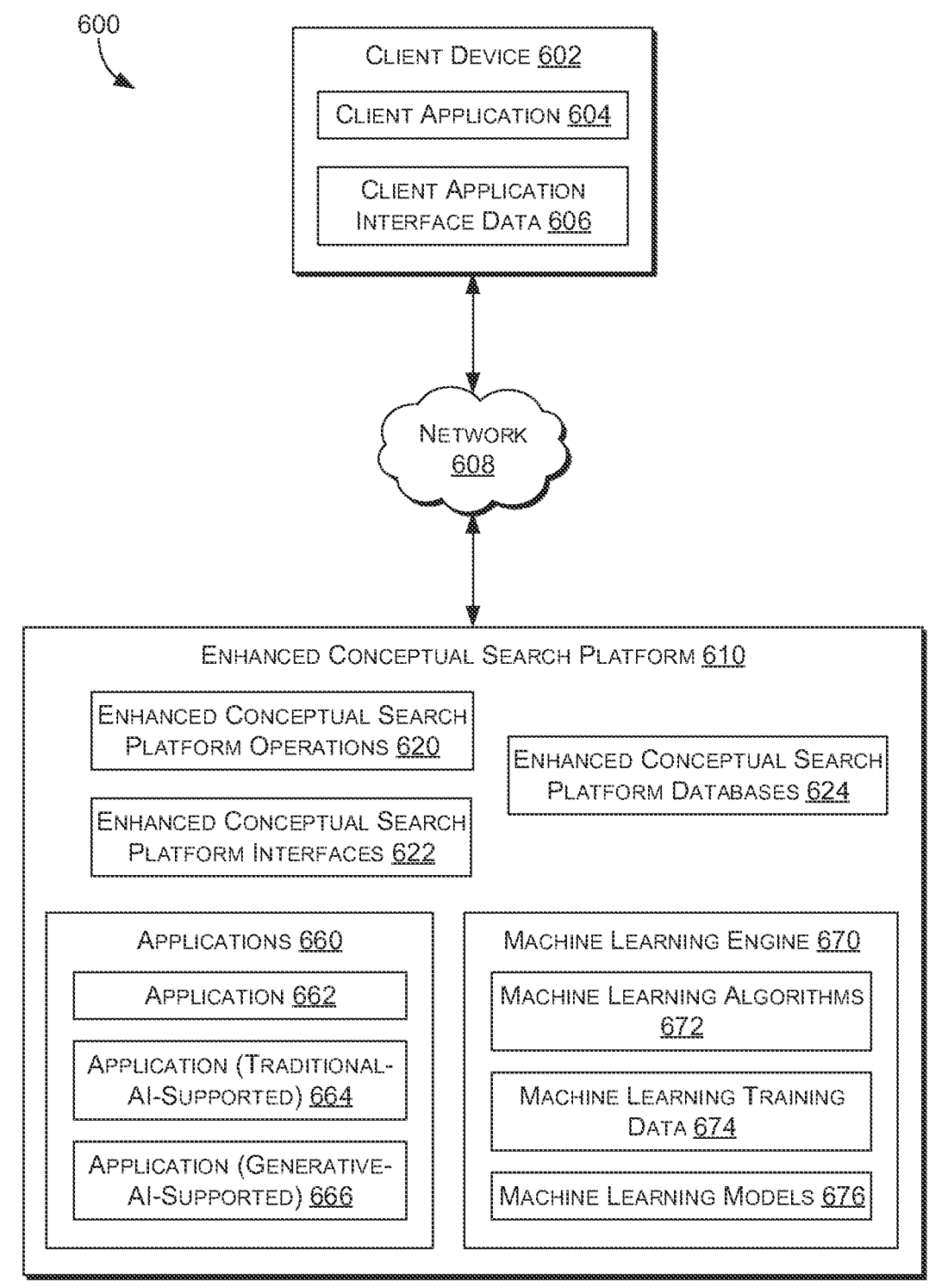
FIG. 6 provides a block diagram of an example enhanced conceptual search computing environment suitable for use in implementing aspects of the technology described herein.

Referring now to FIG. 6, FIG. 6 illustrates an example enhanced conceptual search system 600 computing environment in which implementations of the present disclosure may be employed. In particular, FIG. 6 shows a high level architecture of an example enhanced conceptual search platform 610 that can host a technical solution environment, or a portion thereof. It should be understood that this and other arrangements described herein are set forth as examples. For example, as described above, many elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

The enhanced conceptual search system 600 can be a cloud computing environment that provides computing resources for functionality associated with the enhanced conceptual search platform 610. For example, the enhanced conceptual search system 600 supports delivery of computing components and services-including servers, storage, databases, networking, applications, and machine learning associated with the enhanced conceptual search platform 610 and client device 602. A plurality of client devices (e.g., client device 602) include hardware or software that access resources on the enhanced conceptual search system 600. Client device 602 can include an application (e.g., client application 604) and interface data (e.g., client application interface data 606) that support client-side functionality associated with the enhanced conceptualized search system 600. The plurality of client devices can access computing components of the enhanced conceptual search system 600 via a network (e.g., network 608) to perform computing operations.

The enhanced conceptual search platform 610 is responsible for providing a computing environment or architecture that includes the infrastructure that supports providing enhanced conceptual search platform functionality (e.g., e-commerce functionality). The enhanced conceptual search platform 610 can support storing item listings, item listings vectors, user interaction histories, etc., in the enhanced conceptual search platform databases 624. The enhanced conceptual search platform 610 can also provide a search system for receiving queries and identifying search results based on the queries. The enhanced conceptual search platform 610 may also provide a computing environment with features for managing, selling, buying, and recommending different types of items. The enhanced conceptual search platform 610 can specifically be for a content platform, such as EBAY content platform or e-commerce platform, developed by EBAY INC., of San Jose, California.

The enhanced conceptual search platform 610 can provide enhanced conceptual search platform operations 620 and enhanced conceptual search platform interfaces 622. The enhanced conceptual search platform operations 620 can include service operations, communication operations, resource management operations, security operations, and fault tolerance operations that support specific tasks or functions in the enhanced conceptual search platform 610. The enhanced conceptual search platform interfaces 622 can include service interfaces, communication interfaces, resource interfaces, security interfaces, and management and monitoring interfaces that support functionality between the enhanced conceptual search platform components. The enhanced conceptual search platform operations 620 and enhanced conceptual search platform interfaces 622 can enable communication, coordination and seamless functioning of the enhanced conceptual search system 600.

By way of example, functionality associated with enhanced conceptual search platform 610 can include shopping operations (e.g., product search and browsing, product selection and shopping cart, checkout and payment, and order tracking); user account operations (e.g., user registration and authentication, and user profiles); seller and product management operations (e.g., seller registration and product listing and inventory management); payment and financial operations (e.g., payment processing, refunds and returns); order fulfillment operations (e.g., order processing and fulfillment and inventory management); customer support and communication interfaces (e.g., customer support chat/email and notifications); security and privacy interfaces (e.g., authentication and authorization, payment security); recommendation and personalization interfaces (e.g., product recommendations and customer reviews and ratings); analytics and report interfaces (e.g., sales and inventory reports, and user behavior analytics); and APIs and Integration Interfaces (e.g., APIs for Third-Party Integration).

The enhanced conceptual search platform 610 can provide enhanced conceptual search platform databases (e.g., enhanced conceptual search platform databases 624) to manage and store different types of data efficiently. The enhanced conceptual search platform databases 624 can include relational databases, NoSQL databases, search databases, cache databases, content management systems, analytics databases, payment gateway database, customer relationship management databases, log and error databases, inventory and supply chain databases, and multi-channel databases that are used in combination to efficiently manage data and provide e-commerce experience for users.

The enhanced conceptual search platform 610 supports applications (e.g., applications 660) that can include a computer program or software component or service that serves a specific function or set of functions to fulfil a particular enhanced conceptual search platform requirement or user requirement. Applications can be client-side (user-facing) and server-side (backend). Applications can also include application without any AI support (e.g., application 662) application supported by traditional AI model (e.g., application 664), and applications supported by generative AI models (e.g., application 666). By way of example, applications can include an online storefront application, mobile shopping app, admin and management console, payment gateway integration, user account and authentication application, search and recommendation engines, inventory and stock management application, order processing and fulfillment application, customer support and communication tools, content management system, analytics and report applications, marketing and promotion applications, multi-channel integration applications, log and error tracking applications, customer relationship management (CRM) applications, security applications, and APIs and web services that are used in combination to efficiently deliver e-commerce experiences for users.

The enhanced conceptual search platform 610 can include a machine learning engine (e.g., machine learning engine 670). The machine learning engine 670 refers to machine learning framework or machine learning platform that provides the infrastructure and tools to design, train, evaluate, and deploy machine learning models. The machine learning engine 670 can serve as the backbone for developing and deploying machine learning applications and solutions. Machine learning engine 670 can also provide tools for visualizing data and model results, as well as interpreting model decisions to gain insights into how the model is making predictions.

The machine learning engine 670 can provide the necessary libraries, algorithms, and utilities to perform various tasks within the machine learning workflow. The machine learning workflow can include data processing, model selection, model training, model evaluation, hyperparameter tuning, scalability, model deployment, inference, integration, customization, data visualization. Machine learning engine 670 can include pre-trained models for various tasks, simplifying the development process. In this way, the machine learning engine 670 can streamline the entire machine learning process, from data preparation and model training to deployment and inference, making it accessible and efficient for different types of users (e.g., customers, data scientists, machine learning engineers, and developers) working on a wide range of machine learning applications.

Machine learning engine 670 can be implemented in the enhanced conceptual search system 600 as a component that leverages machine learning algorithms and techniques (e.g., machine learning algorithms 672) to enhance various aspects of the enhanced conceptual search system's functionality. Machine learning engine 670 can provide a selection of machine learning algorithms and techniques used to teach computers to learn from data and make predictions or decisions without being explicitly programmed. These techniques are widely used in various applications across different industries, and can include the following examples: supervised learning (e.g., linear regression: classification, support vector machines (SVM); unsupervised learning (e.g., clustering, principal component analysis (PCA), association rules (e.g., apriori); reinforcement learning (e.g., Q-Learning, deep Q-Network (DQN); and deep learning (e.g., neural networks, convolutional neural networks (CNN), and recurrent neural networks (RNN); and ensemble learning random forest.

Machine learning training data 674 supports the process of building, training, and fine-tuning machine learning models. Machine learning training data 674 consists of a labeled dataset that is used to teach a machine learning model to recognize patterns, make predictions, or perform specific tasks. Training data typically comprises two main components: input feature (X) and labels or target values (Y). Input features can include variables, attributes, or characteristics used as input to the machine learning model. Input features (X) can be numeric, categorical, or even textual, depending on the nature of the problem. For example, in a model for predicting house prices, input features might include the number of bedrooms, square footage, neighborhood, and so on. Labels or target values (Y) include the values that the model aims to predict or classify. Labels represent the desired output or the ground truth for each corresponding set of input features. For instance, in a spam email classifier, the labels would indicate whether each email is spam or not (i.e., binary classification). The training process involves presenting the model with the training data, and the model learns to make predictions or decisions by identifying patterns and relationships between the input features (X) and the target values (Y). A machine learning algorithm adjusts its internal parameters during training in order to minimize the difference between its predictions and the actual labels in the training data. Machine learning engine 670 can use historical and real-time data to train models and make predictions, continually improving performance and user experience.

Machine learning engine 670 can include machine learning models (e.g., machine learning models 676) generated using the machine learning engine workflow. Machine learning models 676 can include generative AI models and traditional AI models that can both be employed in the enhanced conceptual search system 600. Generative AI models are designed to generate new data, often in the form of text, images, or other media, based on patterns and knowledge learned from existing data. Generative AI models can be employed in various ways including: content generation, product image generation, personalized product recommendations, natural language chatbots, and content summarization. Traditional AI models encompass a wide range of algorithms and techniques and can be employed in various ways including: recommendation systems, predictive analytics, search algorithms, fraud detection, customer segmentation, image classification, Natural Language Processing (NLP) and A/B testing and optimization. In many cases, a combination of both generative and traditional AI models can be employed to provide a well-rounded and effective e-commerce experience, combining data-driven insights and creativity.

Machine learning engine 670 can be used to analyze data, make predictions, and automate processes to provide a more personalized and efficient shopping experience for users. By way of example, product recommendations search and filtering: pricing optimization, inventory and stock management: customer segmentation, churn prediction and retention, fraud detection, sentiment analysis, customer support and chatbots, image and video analysis, and ad targeting and marketing. The specific applications of machine learning within the enhanced conceptual search platform 610 can vary depending on the specific goals, available data, and resources.

22

Example Computing Device

Having described an overview of embodiments of the present technology, an example operating environment in which embodiments of the present technology may be implemented is described below in order to provide a general context for various aspects. Referring initially to FIG. 7, in particular, an example operating environment for implementing embodiments of the present technology is shown and designated generally as computing device 700. Computing device 700 is but one example of a suitable computing environment and is not intended to suggest any limitation as to the scope of use or functionality of the technology. Neither should computing device 700 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 7, computing device 700 includes bus 702 that directly or indirectly couples the following devices: memory 704, one or more processors 706, one or more presentation components 708, input/output ports 710, input/output components 712, and illustrative power supply 714. Bus 702 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component, such as a display device, to be an I/O component. As another example, processors may also have memory. Such is the nature of the art, and it is again reiterated that the diagram of FIG. 7 merely illustrates an example computing device that can be used in connection with one or more embodiments of the present technology. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, and removable and non-removable media. By way of example, and not limitation, computer-readable media may comprise computer storage media and communication media.

Computer storage media include volatile and nonvolatile, removable and non-removable media implemented in any method or technology for storage of information, such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 704 includes computer storage media in the form of volatile or nonvolatile memory. The memory 704 may be removable, non-removable, or a combination thereof. Example hardware devices include solid-state memory, hard drives, optical-disc drives, etc. Computing device 700 includes one or more processors that read data from various entities such as memory 704 or I/O components 712. Presentation component(s) 708 present data indications to a user or other device. Examples of presentation components include a display device, speaker, printing component, vibrating component, etc.

I/O ports 710 allow computing device 700 to be logically coupled to other devices including I/O components 712, some of which may be built in. Illustrative components include a microphone, joystick, game pad, satellite dish, scanner, printer, wireless device, and so forth.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media.

In addition, words such as "a" and "an," unless otherwise indicated to the contrary, include the plural as well as the singular. Thus, for example, the constraint of "a feature" is satisfied where one or more features are present.

Furthermore, the term "or" includes the conjunctive, the disjunctive, and both (a or b thus includes either a or b, as well as a and b).

For purposes of a detailed discussion above, embodiments of the present technology described with reference to a distributed computing environment; however, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the described schematics, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

Some example aspects of the technology that may be practiced from the forgoing disclosure include the following:

Aspect 1: A computer-implemented method comprising: receiving a search query at a search engine; generating a search vector based on the search query; determining an item listing vector based on the search vector, the item listing vector of an item listing for an item of a corpus of item listings, the item listing vector generated using one or more generative artificial intelligence models trained to generate the item listing vector based on an image of the item and a textual description of the item, the item listing vector representing at least two categories determined for the item listing; and providing a search result for the search query based on determining the item listing vector.

Aspect 2: Aspect 1, wherein the at least two categories are determined from an image aspect from the image of the item and a keyword from the textual description of the item.

Aspect 3: Aspect 1 or 2, the search vector being generated based on a set of prior user interactions of a user associated with the search query, the set of prior user interactions being identified by applying a generative artificial intelligence model to a plurality of prior user interactions of the user.

Aspect 4: Aspect 1, 2, or 3, wherein a plurality of item listing vectors, including the item listing vector of the item listing for the item, are generated by: determining, by the one or more generative artificial intelligence models, a first category, of the at least two categories, for a feature depicted on a first set of items within item images within the item listings of the corpus; determining, by the one or more generative artificial intelligence models, a second category, of the at least two categories, for a second feature depicted on the first set of items; and generating the plurality of item listing vectors for the first set of items based on the first category and the second category.

Aspect 5: Aspect 1, 2, 3, or 4, wherein the second category is based on matching the second feature depicted on the first set of items with a keyword within textual descriptions of the first set of items.

Aspect 6: Aspect 1, 2, 3, 4, or 5, wherein the second category is a broader category than the first category.

Aspect 7: Aspect 1, 2, 3, 4, 5, or 6, the item listing vector further determined based on a set of prior user interactions with one or more of the item listings of the corpus, the set of prior user interactions being identified by applying a generative artificial intelligence model to a plurality of prior user interactions with the one or more of the item listings having the at least two categories including the first category and the second category.

Aspect 8: Aspect 1, 2, 3, 4, 5, 6, or 7, further comprising providing a plurality of search results, including the search result, for the search query based on determining the item listing vector; receiving feedback based on providing the plurality of search results; modifying the search vector based on the feedback; and providing a second plurality of search results for the modified search vector.

Aspect 9: a computer system comprising: a processor; and a computer storage medium storing computer-useable instructions that, when used by the processor, causes the computer system to perform operations comprising: receiving a search query at a search engine; generating a search vector based on the search query; determining an item listing vector based on the search vector, the item listing vector from a plurality of item listing vectors for a plurality of item listings, each of the plurality of item listing vectors generated using one or more generative artificial intelligence models trained to generate the plurality of item listing vectors based on both an image and a textual description of an associated item; and providing a search result for the search query based on determining the item listing vector.

Aspect 10: Aspect 9, wherein each of the plurality of item listing vectors are generated by determining, by the one or more generative artificial intelligence models, a first category for a feature depicted on the associated item within the image, the first category for the feature being included within the textual description of the associated item.

Aspect 11: Aspect 9, or 10, wherein each of the plurality of item listing vectors are generated by determining, by the one or more generative artificial intelligence models, a second category for another feature depicted on the associated item within the image, the second category for the feature being included within the textual description of the associated item.

Aspect 12: Aspect 9, 10, or 11, the search vector being generated based on a set of prior user interactions of a user associated with the search query, the set of prior user interactions being identified by applying a generative artificial intelligence model to a plurality of prior user interactions of the user to identify the set of prior user interactions corresponding to the first category and the second category.

Aspect 13: Aspect 9, 10, 11, or 12, the search vector being generated from a textual embedding and an image embedding by applying the one or more generative artificial intelligence models to prior user interactions.

Aspect 14: Aspect 9, 10, 11, 12, or 13, wherein each of the plurality of item listing vectors are generated by determining, by the one or more generative artificial intelligence models, a plurality of categories for a feature depicted on the associated item within the image, wherein each of the plurality of categories are a different category than a predominating category for the associated item itself.

Aspect 15: one or more computer storage media storing computer-useable instructions that, when used by a computing device, cause the computing device to perform operations, the operations comprising: training one or more generative artificial intelligence models to determine a category for an item feature depicted within an image of an item; training the one or more generative artificial intelligence models to determine the category within a textual description of the item; and generating, using the trained one or more generative artificial intelligence models, an item listing vector for each of a plurality of item listings, each of the item listing vectors being generated from at least one category determined from at least one image and textual description associated with a corresponding item listing.

Aspect 16: Aspect 15, wherein the one or more generative artificial intelligence models includes Bidirectional Encoder Representations from Transformers (BERT) and an imaging model.

Aspect 17: Aspect 15 or 16, wherein each of the item listing vectors are generated from a first category and a second category determined from the at least one image and textual description associated with the corresponding item listing, the first category being a broader category than the second category, and wherein the first category and the second category are a different category than a predominating category for the associated item itself.

Aspect 18: Aspect 15, 16, or 17, further comprising regenerating an item listing vector for a first item listing of the plurality of item listings based on applying the one or more generative artificial intelligence models to user interactions with the first item listing.

Aspect 19: Aspect 15, 16, 17, or 18, wherein the user interactions include audio data corresponding to the category.

Aspect 20: Aspect 15, 16, 17, 18, or 19, wherein the first category is a meta-category and the second category is a leaf category.

What is claimed is:

1. A computer-implemented method comprising:

receiving a search query from a user at a search engine;

determining a plurality of similar users identified as having a particular similarity to the user;

generating a search vector based on the search query and a set of similar user interaction data corresponding to the plurality of similar users identified as having a particular similarity to the user;

determining an item listing vector based on the search vector, the item listing vector of an item listing for an item of a corpus of item listings, the item listing vector generated using one or more generative artificial intelligence models trained to generate the item listing vector based on an image of the item and a textual description of the item, the item listing vector representing at least two categories determined for the item listing, wherein a first category is determined from the textual description, and wherein a second category more narrow than the first category is determined from the image; and providing a search result for the search query based on determining the item listing vector, wherein the search result is associated with the second category.

2. The computer-implemented method of claim 1, wherein the at least two categories are determined by the one or more generative artificial intelligence models from an image aspect from the image of the item and a keyword from the textual description of the item.

3. The computer-implemented method of claim 1, the search vector being generated based on a set of prior user interactions of a user associated with the search query, the set of prior user interactions being identified by applying a generative artificial intelligence model to a plurality of prior user interactions of the user.

4. The computer-implemented method of claim 1, wherein a plurality of item listing vectors, including the item listing vector of the item listing for the item, are generated by:

determining, by the one or more generative artificial intelligence models, a first category, of the at least two categories, for a feature depicted on a first set of items within item images within the item listings of the corpus;

determining, by the one or more generative artificial intelligence models, a second category, of the at least two categories, for a second feature depicted on the first set of items; and generating the plurality of item listing vectors for the first set of items based on the first category and the second category.

5. The computer-implemented method of claim 4, wherein the second category is based on matching the second feature depicted on the first set of items with a keyword within textual descriptions of the first set of items.

6. The computer-implemented method of claim 5, wherein the second category is a broader category than the first category.

7. The computer-implemented method of claim 4, the item listing vector further determined based on a set of prior user interactions with one or more of the item listings of the corpus, the set of prior user interactions being identified by applying a generative artificial intelligence model to a plurality of prior user interactions with the one or more of the item listings having the at least two categories including the first category and the second category.

8. The computer-implemented method of claim 1, further comprising:

providing a plurality of search results, including the search result, for the search query based on determining the item listing vector;

receiving feedback based on providing the plurality of search results;

modifying the search vector based on the feedback; and providing a second plurality of search results for the modified search vector.

9. A computer system comprising:

a processor; and a computer storage medium storing computer-useable instructions that, when used by the processor, causes the computer system to perform operations comprising:

receiving a search query from a user at a search engine;

generating a search vector based on the search query and a set of similar user interaction data corresponding to a plurality of similar users identified as having a particular similarity to the user;

determining an item listing vector based on the search vector, the item listing vector from a plurality of item listing vectors for a plurality of item listings, each of the plurality of item listing vectors generated using one or more generative artificial intelligence models trained to generate the plurality of item listing vectors based on both an image and a textual description of an associated item, wherein a first category is determined from the textual description, and wherein a second category more narrow than the first category is determined from the image; and providing a search result for the search query based on determining the item listing vector, wherein the search result is associated with the second category.

10. The computer system of claim 9, wherein each of the plurality of item listing vectors are generated by determining, by the one or more generative artificial intelligence models, a first category for a feature depicted on the associated item within the image, the first category for the feature being included within the textual description of the associated item.

11. The computer system of claim 10, wherein each of the plurality of item listing vectors are generated by determining, by the one or more generative artificial intelligence models, a second category for another feature depicted on the associated item within the image, the second category for the feature being included within the textual description of the associated item.

12. The computer system of claim 11, the search vector being generated based on a set of prior user interactions of a user associated with the search query, the set of prior user interactions being identified by applying a generative artificial intelligence model to a plurality of prior user interactions of the user to identify the set of prior user interactions corresponding to the first category and the second category.

13. The computer system of claim 9, the search vector being generated from a textual embedding and an image embedding by applying the one or more generative artificial intelligence models to prior user interactions.

14. The computer system of claim 9, wherein each of the plurality of item listing vectors are generated by determining, by the one or more generative artificial intelligence models, a plurality of categories for a feature depicted on the associated item within the image, wherein each of the plurality of categories are a different category than a predominating category for the associated item itself.

15. One or more non-transitory computer storage media storing computer-useable instructions that, when used by a user device, cause the user device to perform operations, the operations comprising:

determining a plurality of similar users identified as having a particular similarity to a user;

generating a search vector for a search query received from the user based on the search query and a set of similar user interaction data corresponding to the plurality of similar users identified as having a particular similarity to the user; and executing an item search by identifying, based on the search vector, an item listing vector of an item, the item listing vector being generated from at least one category, the at least one category generated by one or more generative artificial intelligence models using at least one image and a textual description associated with a corresponding item listing, the one or more generative artificial intelligence models trained to determine categories for item features depicted within images of items and textual descriptions of the items, wherein a first category is determined from the textual descriptions, and wherein a second category more narrow than the first category is determined from the at least one image.

16. The one or more non-transitory computer storage media of claim 15, wherein the one or more generative artificial intelligence models includes Bidirectional Encoder Representations from Transformers (BERT) and an imaging model.

17. The one or more non-transitory computer storage media of claim 15, wherein each of the item listing vectors are generated from a first category and a second category determined from the at least one image and textual description associated with the corresponding item listing, the first category being a broader category than the second category, and wherein the first category and the second category are a different category than a predominating category for the associated item itself.

18. The one or more non-transitory computer storage media of claim 17, further comprising regenerating an item listing vector for a first item listing of the plurality of item listings based on applying the one or more generative artificial intelligence models to user interactions with the first item listing.

19. The one or more non-transitory computer storage media of claim 18, wherein the user interactions include audio data corresponding to the category.

20. The one or more non-transitory computer storage media of claim 19, wherein the first category is a meta-category and the second category is a leaf category.

* * * * *